(12) United States Patent
Morris et al.

(10) Patent No.: US 6,319,168 B1
(45) Date of Patent: Nov. 20, 2001

(54) APPARATUS AND METHOD FOR ACTIVE TRANSMISSION SYNCHRONIZATION AND SHIFTING

(75) Inventors: Robert L. Morris, Milford; Kevin S. Kidston, New Hudson; Shawn D. Sarbacker, Royal Oak; Sunil M. Chhaya, Troy; Bryan R. Snyder, Waterford, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/557,166

(22) Filed: Apr. 25, 2000

(51) Int. Cl.[7] .................................................. B60K 41/02
(52) U.S. Cl. ...................................................... 477/5
(58) Field of Search ............................................ 477/5, 3

(56) References Cited

U.S. PATENT DOCUMENTS

| | | | |
|---|---|---|---|
| 5,993,350 | * 11/1999 | Lawrie et al. | 477/5 |
| 5,994,630 | * 8/1999 | Omote | 477/5 |
| 6,083,138 | * 7/2000 | Aoyama et al. | 477/5 |

* cited by examiner

Primary Examiner—Dirk Wright
(74) Attorney, Agent, or Firm—Anthony Luke Simon

(57) ABSTRACT

A propulsion system designed for hybrid vehicle's utilizing a first torque path from a coupled motor generator system and internal combustion engine through and automatically shifted manual transmission having a secondary torque path from a secondary torque source to the wheels. The system incorporates the high-efficiency of a manual transmission with the smoothness of the most advanced automatic transmissions by utilizing a second torque path to maintain driver requested torque during shifts. The system is also capable of performing shifts without opening the clutch by utilizing active synchronization of the input shaft RPM combined with the force control of the shifting actuator. This results in fast and smooth shifts that disengage and reengage without unpleasant torque pulsations.

19 Claims, 5 Drawing Sheets

APPARATUS AND METHOD FOR ACTIVE TRANSMISSION SYNCHRONIZATION AND SHIFTING

The present invention is related to a method and apparatus for minimizing the torque oscillations in the driveline of a hybrid vehicle.

BACKGROUND OF THE INVENTION

Passenger comfort and fuel efficiency have set forth increasing demands on automotive vehicle designs. It is a primary goal of most vehicle designs to provide a more efficient vehicle without having to sacrifice passenger comfort and satisfaction.

Moreover, and as alternative vehicle propulsion systems are implemented, passenger comfort and fuel efficiency are sometimes in opposition to each other. This is particularly true in hybrid vehicle designs.

A Hybrid Vehicle is a vehicle that has at least two sources of energy. A hybrid electric vehicle (HEV) is a vehicle wherein one of the sources of energy is electric and the other source of energy may be derived from a heat engine that burns diesel, gasoline or any other source of chemical energy.

Generally, a hybrid vehicle utilizes more than one type of energy storage. The HEV incorporates both electric energy and chemical energy storage which is then converted into mechanical power to propel the vehicle and drive vehicle systems. Numerous ways of coupling the systems may be employed and typically take the form of one or more heat engines and one or more electric drives which are coupled to a transmission device to one or more of the wheels. This induces a significant complexity since the performance, responsiveness and smoothness of these devices is typically quite different. So, while an efficiency gain may be obtained from the system, the complexity of controlling it to provide the smooth response expected by the driver becomes far more difficult.

Given the high priority on efficiency in a hybrid vehicle, the task of coupling the torque sources to the wheels is well-suited to an automated manual transmission, which can be electronically controlled and has one of the highest efficiencies of any transmission device.

The transmission is positioned in the drive train between the heat engine and the driven wheels. The transmission includes a case containing an input shaft, an output shaft, and a plurality of meshing gears. Means are provided for connecting selected ones of the meshing gears between the input shaft and the output shaft to provide a desired speed reduction gear ratio therebetween. The meshing gears contained within the transmission case are of varying size so as to provide a plurality of such gear ratios. By appropriately shifting among these various gear ratios, acceleration and deceleration of the vehicle can be accomplished in a smooth and efficient manner.

However, the drivability of a hybrid vehicle is adversely affected due to the torque oscillations that occur when abrupt torque changes are encountered in the operation of the internal combustion engine and the transmission coupled to it. Such oscillations are encountered during shifting and launching.

For example, an automobile requires higher torque demands at low speeds for acceleration with a decreasing demand as the cruise speed is approached.

Accordingly, and in order to meet the torque demand of the automobile's acceleration, a transmission having multiple gear ratios must be coupled to an internal combustion engine.

The combination of high driveline efficiencies, which have little damping, and more than one source of torque to be applied to the wheels, creates both problems and opportunities. This is especially apparent during shifts and initial launching of the vehicle. Unlike an automatic, planetary style transmission, a manual transmission is unable to apply torque to the wheels during a shift, and so by itself it possesses a significant reduction in performance and driver pleasability. A solution in a parallel hybrid vehicle is to utilize a secondary torque source that is not coupled through the transmission but is either after the transmission on the same axle, or on a different pair of wheels altogether. Therefore, by careful component design and selection, a hybrid system can be optimized for efficiency as well as performance and smoothness.

In contrast, to the torque oscillations of an automated manual transmission, an electric motor or drive train produces higher torques at startup which decrease as increasing speed is reached.

Accordingly, and since the torque output of an electric motor is similar to demands of the vehicle, there is no requirement for a transmission or drive train used with a high-efficiency internal combustion engine. Therefore, and in order to accommodate the differences between the driving units of a hybrid vehicle, synchronization between the driving force of the two motors or drive trains is necessary.

Additionally, the damping of the torque oscillations of an automated manual transmission will further enhance the drivability and performance of the same.

Accordingly, and in order to provide a highly efficient hybrid vehicle that utilizes a fuel efficient internal combustion engine, the torque oscillations caused by a direct coupled drive train must be minimized.

In addition, hybrid vehicles also utilize a concept known as regenerative braking. Generally, regenerative braking is the conversion of the vehicle's kinetic energy into a source of electrical power. The vehicle's kinetic energy is converted from the spinning wheels, in response to a user request to slow or stop the vehicle. A generator is manipulated, and accordingly, produces electrical energy as it applies a stopping force to the vehicle's axle and/or drive train in response to a stopping request.

Therefore, and in accordance with regenerative braking, the kinetic energy is converted to electric energy as the vehicle begins to slow down.

SUMMARY OF THE INVENTION

With the importance of driveline efficiencies in today's vehicles and especially with hybrid vehicles, a manual transmission is the best solution for optimizing this efficiency. Unfortunately, a manual transmission as in a standard arrangement has many shortcomings. These are mainly that it is slow to shift, has no torque to the wheels during a shift, is often rough when re-engaging the clutch after a shift, wastes part of the kinetic energy stored in engine inertia during a shift, and automated, requires complex clutch control to attempt to perform shifts smoothly.

When the system is incorporated into a hybrid vehicle, with a secondary drive system connected to it, numerous improvements can be made. Automating the manual transmission and utilizing active speed synchronization and total torque control, allows many of the negative features to be removed. Shifts can be performed quickly, without opening the clutch, smooth engagement and disengagement of each gear becomes possible, energy is recovered during upshifts, and synchronization hardware inside transmission can be removed to save cost and weight. Additionally, a hybrid vehicle can be configured such that a secondary means of applying torque to the wheels can be used so that during a shift of the automated manual on the primary drive train, the torque is made up with the secondary system such that no change in acceleration is noted by the driver. The end result is a drive train that is highly efficient and as smooth as the best automatic transmissions.

These concepts also apply to a standard automated manual transmission connected to a single torque source such as an ICE or single electric drive, though the speed of the system is reduced and the ability to transfer torque to the wheels during a shift is lost. But, a single torque source could be used to perform the synchronization and clutch closed shifting by itself.

BRIEF DESCRIPTION OF THE DRAWINGS

The present invention will now be described by way of example only, with reference to the accompanying drawings in which.

DETAILED DESCRIPTION OF THE PREFERRED EMBODIMENTS

Figure 1:
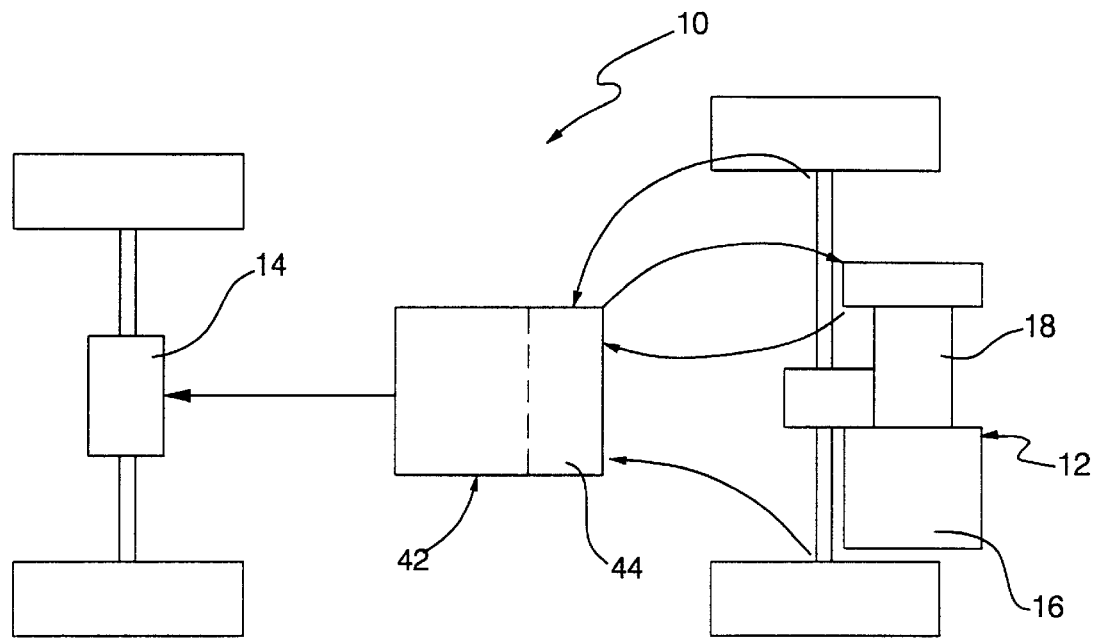
FIG. 1 is a diagram illustrating the hybrid vehicle system configuration of an exemplary embodiment of the instant application.

Referring now to FIG. 1, a hybrid vehicle system configuration contemplated for use with the present invention is illustrated.

A hybrid vehicle 10 is configured to have a rear propulsion system 12 and a front propulsion system 14. Rear propulsion system 12 has an internal combustion engine 16 which provides a driving force to an automated manual transmission 18 which converts the driving force of internal combustion engine 16 into the required torque for driving the rear wheels of hybrid vehicle 10.

In the preferred embodiment, front propulsion system 14 is an electric traction drive with a continuous torque output. Alternatively, front propulsion system 14 is a hydraulic or flywheel system or an ICE without any transmission.

In the preferred embodiment, internal combustion engine 16 is a high-efficiency diesel engine. However, and in accordance with the present invention, engine 16 can be any form of heat engine which will produce a controlled amount of torque. In addition, and as an alternative, the ICE and the main propulsion system may be located anywhere within the vehicles such as, in close proximity to the front wheels, along the rear axle or centrally located within the vehicle.

Figure 2:
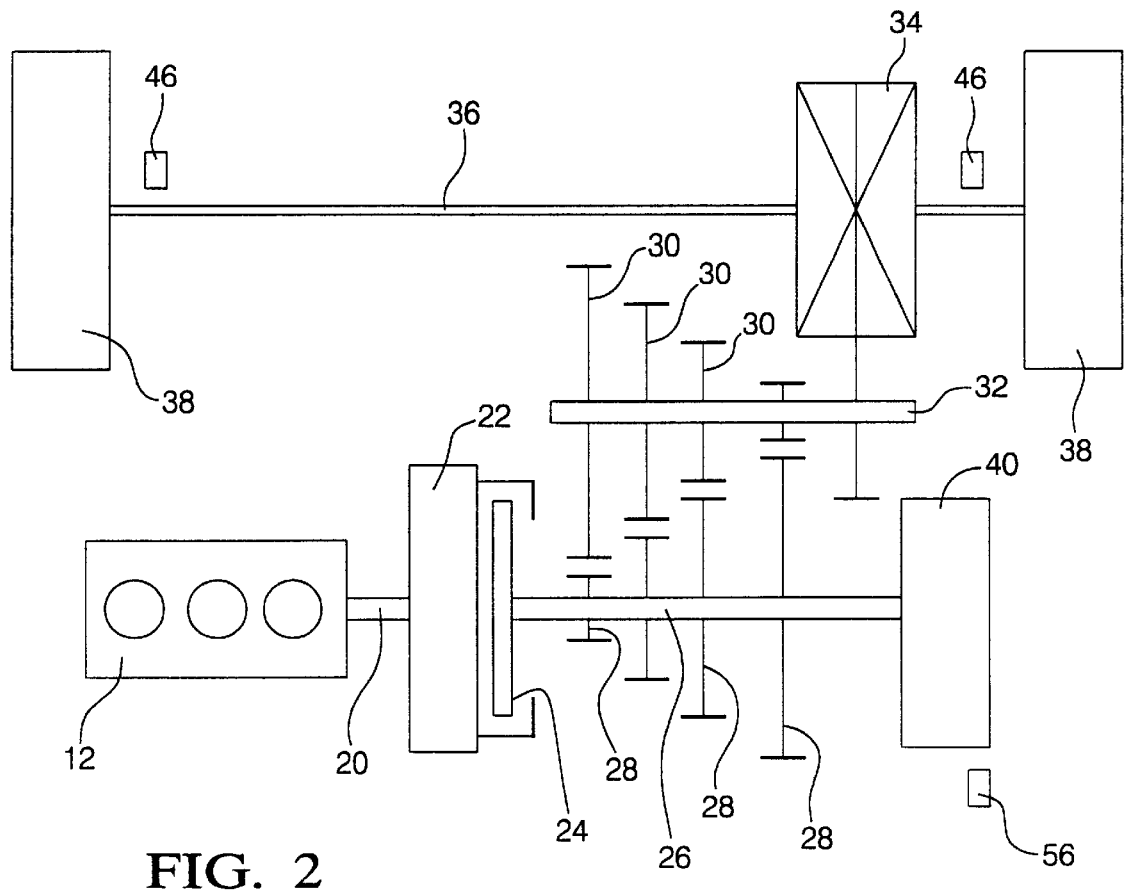
FIG. 2 is a diagram illustrating the rear propulsion system configuration of an exemplary embodiment of the instant application.
Figure 3A:
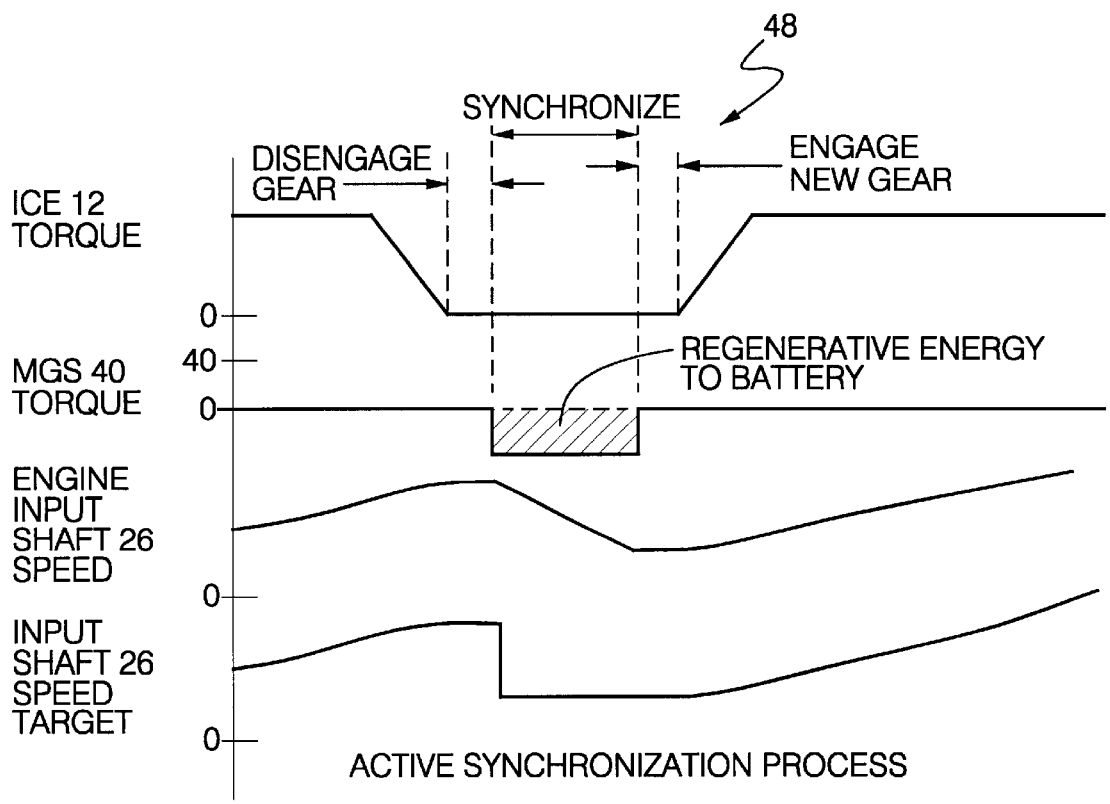
FIG. 3A is a chart representing a shifting sequence of a hybrid vehicle as contemplated in accordance with an exemplary embodiment of the instant application.

Referring now to FIGS. 1 and 2, component parts of rear propulsion system 12 are illustrated. In response to a user or drivers manipulation of an accelerator mechanism (not shown), internal combustion engine 16 provides a rotational force to a driveshaft 20 that is coupled to a flywheel 22. In order to transfer the rotational force from flywheel 22 to automated manual transmission 18, a clutch 24 is positioned to engage and disengage flywheel 22.

Clutch 24 can be a mechanism employing a controllable clutch. Clutch 24 is coupled to an input shaft 26 of automated manual transmission 18. Input shaft 26 is coupled to a plurality of input gears 28. Each one of input gears 28 has a differing diameter and/or gear tooth ratio which provides a differing torque value which in response to a gearshift command makes contact with a corresponding one of a plurality of output gears 30 which are secured to an output shaft 32 of automated manual transmission 18. Similarly, output gears 30 each have a differing diameter and/or gear tooth ratio.

Output shaft 32 ultimately provides a resulting driving force to a rear differential 34 and a respective axle 36 that provides a rotational force to rear wheels 38 of hybrid vehicle 10.

An electric motor/generator system 40 is also coupled to input shaft 26. Motor/generator system 40 is coupled to input shaft 26 at a positioned remote from clutch 24. Accordingly, and as a rotational force is applied to input shaft 26, motor/generator system 40 can be rotated to provide a source of electrical power for use in hybrid vehicle 10, as well as a rotational driving force to shaft 26.

Alternatively, the motor/generator system can be built into or coupled to the flywheel instead of being directly coupled to the transmission.

In addition, and as an alternative embodiment, the secondary electric motor can be positioned to provide a driving force to the differential or directly to the wheels wherein a plurality of wheel motors may be utilized.

In addition, and since the motor generator is coupled to the input shaft of the transmission, it may be utilized to assist during the transmission shifts. This process would be as follows. Four primary controls are implemented to perform the shifting of the transmission.

The first control is torque control of the input shaft. Since both the ICE and MGS are coupled to the input shaft, they are each controlled individually to obtain the desired sum input shaft torque. Since the ICE is slower to respond, and produces higher omissions during changes in torque, it can be primarily supplemented by the MGS to obtain the desired input shaft torque up to the capability of the MGS. This form of control is implemented whenever a gear of the transmission is engaged.

The second control is the speed control of the input shaft. This occurs with the combination of torque commands to the MGS and the ICE. Typically, whichever system is more responsive will be used as the primary controller of speed, which in this instance was the MGS. This control method will be used anytime the transmission is not in gear and utilized for active synchronization during shifts. Additionally, this is implemented with numerous modes containing different gains and damping of the speed control. This allows for optimum speed control to be used in each instance.

The third control is shift actuator controls which consists of both speed control and force control depending on the situation needed. Each is used during different phases of the gearshift.

The fourth control is clutch control which is used to launch the vehicle from a low speed where the current gear ratio would require too low of an input shaft speed for the engine if the clutch would be locked.

A standard shift goes through the following steps. When a gearshift is commanded, a target torque profile is determined for the input shaft sum torque which will reduce the torque from the current value to below zero. The combined control of the ICE and MGS is used to obtain this profile. As the torque is reduced below a calibrated value, the transmission shift control begins supplying a preset force to the shift fork. Due to the design of the gear engagement mechanism, a proportional amount of force is required to disengage the gear depending upon the torque being carried across the gears.

Therefore, the minimum disengagement force is found when there is no torque being transmitted through the gear train. The calibrated force on the shift fork is just enough to move the fork as the torque on the transmission approaches zero. In this way it is ensured that the gear disengagement occurs smoothly and without undue positive or negative torque being transmitted to the wheels. Also during this time, the difference between the driver torque requested and the achieved torque through the transmission is being compensated for by the secondary drivetrain. In this way, the driver senses no changes to vehicle performance during the shift.

Once in neutral, the shift fork control switches from force control to a target position that is just short of touching the synchronizer for the next gear. Maximum force is allowed during this time to reach this position as quickly as possible. At the same time, the ICE and MGS act together to change the input shaft speed to the target speed for the new gear. During this period, high gains are used to reach the target speed as fast as possible. Also, a small, calibrated offset is employed to aid in gear engagement. If the vehicle is accelerating, the offset is below the true target speed, and if the vehicle is decelerating, the offset is above the true target speed.

As the MGS and engine reach the target speed and stabilize, a filtered value of the sum torque is measured. This value is a combination of torque errors, and the amount of torque required to spin the input shaft at that speed. This value can be used to correct the torque maps, but is primarily used for an offset value and starting torque when engaging the gear. In this way, as the gear is engaged, a true zero torque can be kept on the input shaft and then after the gear is engaged, a new torque profile, starting from the true zero, can be used to ramp up the input shaft torque. This notably increases the smoothness of the shifts.

When both the shift fork has reached its position target and the speed of the input shaft has stabilized, the shift engagement can begin. The shift fork is controlled to a certain force value that is equivalent to the amount of force needed to engage the gear under perfect alignment and then the force is increased at a specific rate until engagement is accomplished. At the same time, the speed control for the ICE and MGS is changed to a lower gain mode to insure a soft engagement, and the target offset is ramped through zero. In this way, the synchronizers or engagement teeth are initially misaligned slightly by intent and then allowed to line up as the shift fork engages.

Additionally, by biasing the offset on the acceleration, the teeth will be likely to line up smoothly and cross over the gear lash zone only once, instead of bouncing in the lash which causes noticeable roughness to the driver. To insure successful engagement, limits are set on both the amount of force that the shift fork will apply and the length of time that it will attempt engagement. If either of these are exceeded, the shift fork control will back up and start the engagement again. This ensures that if a "tooth to tooth" condition occurs, the control will pull away and start again.

As the shift fork reaches full engagement, the control of the ICE and MGS switches from speed control to torque control, and as mentioned above, a target input shaft torque profile is determined, which starts from the previously determined torque offset, and ramps back up to the driver requested torque. In this way, a fast, repeatable and smooth shift can be performed by utilizing the ability of all three systems, the ICE, the MGS and the automated manual transmission.

One variation of the shift is employed. If the target input shaft speed is below the engine idle speed, the clutch must be opened. In this case, the ICE simply idles and the MGS performs as normal except that during engagement it uses an even lower gain on the speed control because of the lack of engine inertia. This is necessary to maintain smooth engagements. Once the gear is engaged, the clutch control comes into play and a launch occurs.

This system of shifting obtains the following properties: smoothness is optimized by carefully controlling the torque changes during engagement and disengagement, and by ensuring that a zero torque condition exists at the moments of disengagement and engagement. Shift speed is optimized by combining both ICE torque and MGS torque to actively synchronize to each new gear. Driveline performance is enhanced by the ability to utilize both the MGS and the ICE together for transmitting torque to the wheels. The ability to shift without opening the clutch not only improves speed and smoothness, by removing the time needed for opening and closing it, but also recoups the energy stored in the engine and flywheel inertia while performing an upshift because the MGS is used as a generator to the batteries to slow all the inertia down.

Launch control using the clutch will be utilized anytime the current gear ratio and wheel speed is such that the input shaft speed is below the engine idle speed or the target engine launch speed. In these cases the clutch is used to balance the intended engine torque such that the engine speed remains constant. Also, the MGS will offset any variations in clutch torque, allowing a target torque profile based upon the driver's request to be implemented. This means that the engine will attempt to produce the target torque, the clutch will control the engine speed and thus balance the actual torque being produced by the engine, and the MGS will make any corrections needed to insure that the actual input shaft torque is equal to the target torque profile. Doing so results in smooth transitions of input shaft torque while maintaining the engine at a desired RPM which can be picked for the optimal combination of smoothness, efficiency and power.

Figure 3B:
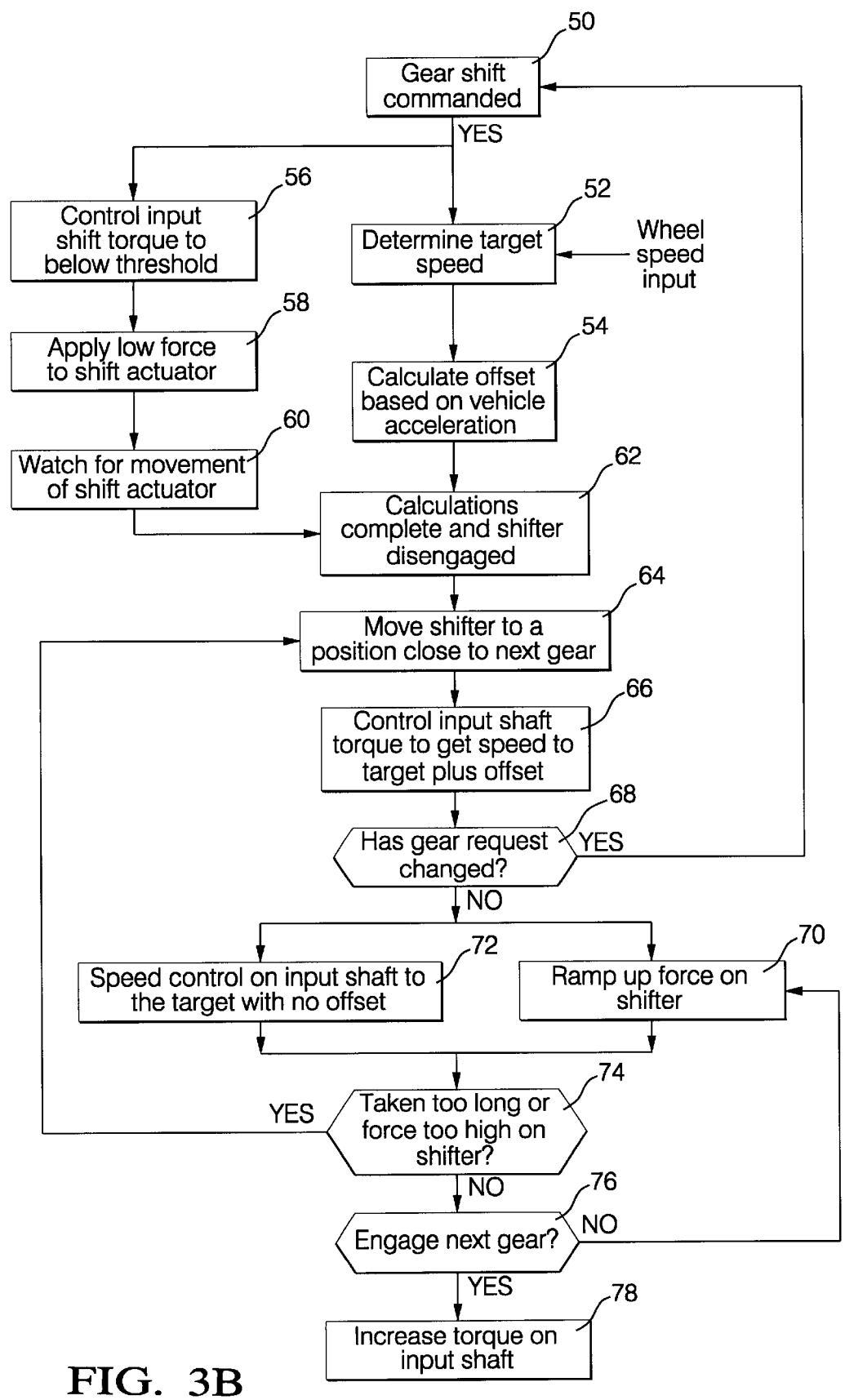
FIG. 3B is a detailed flowchart of a shifting sequence.

Referring now to FIG. 3b, a flowchart 48 illustrates portions of a shifting sequence in accordance with an exemplary embodiment of the present invention. A first decision node or step 50 determines whether a gearshift command has been received. If so, a step 52 determines the "target speed" of the input shaft. In addition, step 52 receives an input in the form of the vehicle's wheel speed. This input is used in the determination of the target speed. Once the target speed has been determined a step 54 calculates the "offset" based upon the vehicle's current status i.e. acceleration, deceleration and or coasting.

In addition, a controller represented by step 56 reduces the input shaft torque to below the required threshold. Another controller represented by step 58 applies a predetermined, through calibration, low force to the shift actuator and a step 60 will receive inputs that are indicative of the movement of the shift actuator.

A step 62 receives the completed calculations from steps 52 and 54 and is informed when the shifter has been disengaged. A command step 64 constricts the shifter to move to a position close to the next gear. A step 66 provides a control input to modify the shaft torque in order to get the shaft speed to the "target speed" plus the calculated "offset". The first part of the gear engagement requires a speed offset to ensure that the synchronizer blocker ring is preloaded in a known direction.

A decision node 68 determines whether the gear request has changed. If so, the process returns to decision node 50. If on the other hand, the gear requesthas not changed a command step 70 instructs the force on the shifter to be ramped up. In addition, a command step 72 controls the speed on the input shaft to insure that the target speed is met with no "offset". The second part of the gear engagement removes the speed offset to release the preload on the blocker ring, allowing the engaging teeth to line up and the shift force is increased to push the aligned teeth together.

A decision node 74 determines whether the shift process has taken too long or the force is too high on the shifter. In order to facilitate this process, a time constant can be used to determine whether the process has taken too long. In addition, a threshold force value can be employed to determine whether the force on the shifter is too high.

If either the time elapsed is too long or the force is too high, the process returns to command step 64. If not, a decision node 76 determines whether the next gear has been engaged. If not, the process is returned to command step 70 wherein the force on the shifter is further ramped up in order to ensure gear engagement. If on the other hand, the next gear has been engaged a command step 78 instructs the torque on the input shaft to be modified in accordance with the driver's request.

Figure 4:
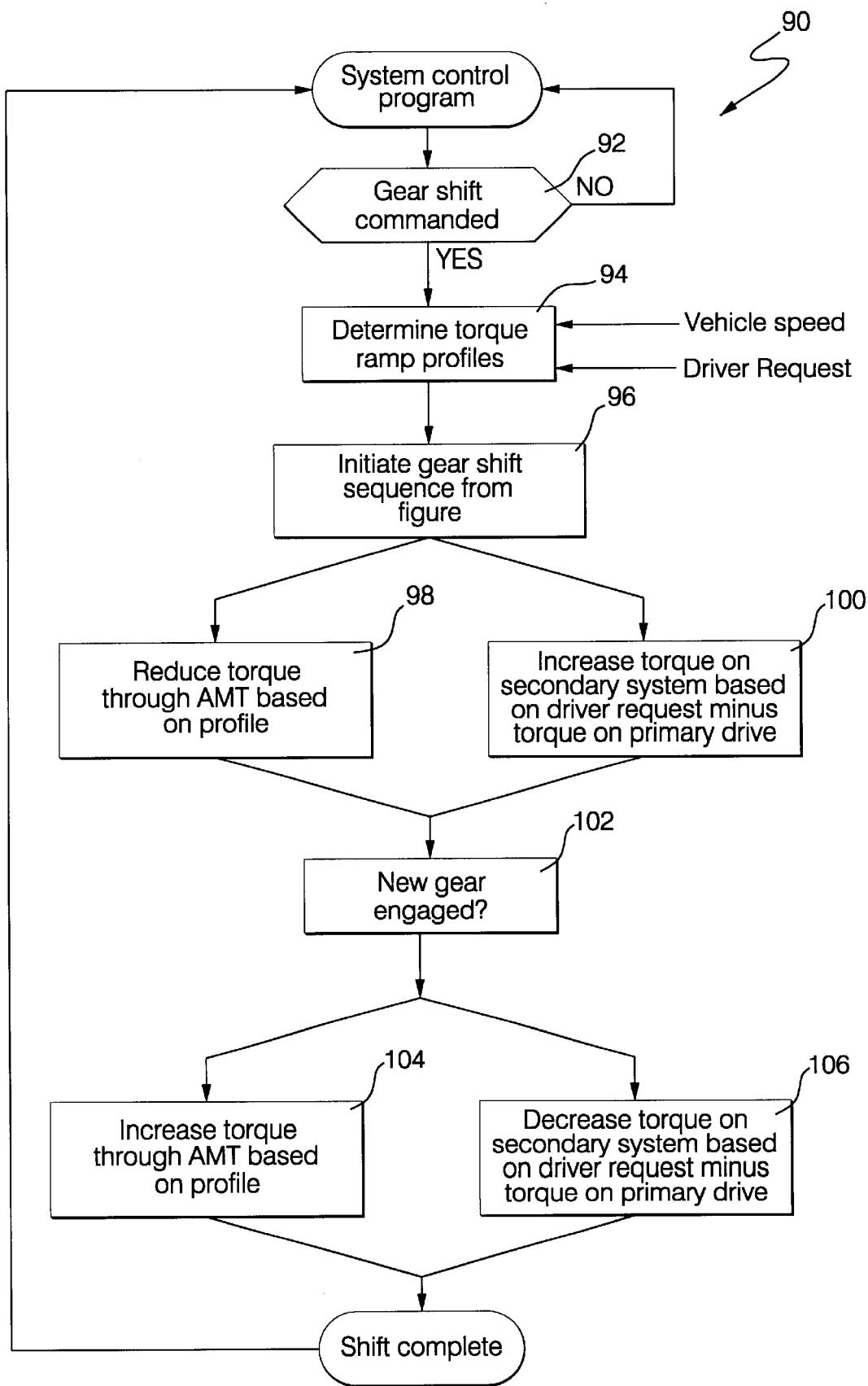
FIG. 4 is a flowchart depicting a control process as contemplated with an exemplary embodiment of the instant application.

Referring now to FIG. 4, a flow chart 90 illustrates portions of a possible command sequence of rear propulsion control system 44 in which a gearshift command is received/ outputted by rear propulsion control system 44. The gearshift command may be in response to a user request or an automatic response or keyed to an acceleration demand.

Here a decision node 92 determines whether a gearshift has been command. If so, a step 94 determines the torque ramp profiles. In determining these profiles step 94 receives inputs in the form of vehicles speed and driver request.

A step 96 now initiates the gearshift sequence outlined in FIG. 3b. A command step 98 instructs the torque through the automated manual transmission to be reduced based upon the profile while another command step 100 increases the torque on the secondary system based upon the driver request less any torque on the primary drive.

A decision node 102 determines whether a new gear has been engaged. If so a command step 104 increases the torque through the automated manual transmission based upon the profile while another command step 106 decreases the torque on the secondary system based upon the driver request less any torque on the primary drive.

In summation, the process can be generally outlined as follows. A shift sequence started and the system controller determines the input shaft speed and the required synchronizing speed. The shaft is unloaded and a new gear is engaged and the force upon the gearshift there is controlled. Throughout the process the torque is controlled in order to synchronize and control the target speed as well as controlling the force of the shifter. Moreover, the torque is controlled for retries of the shifting process. The new gear is engaged and the shaft is reloaded with a driving torque force. The process is also the same for either an upshift or downshift.

Upon determining the intent of the shift to a different gear, the following occurs. Both rear wheel speeds are measured and averaged to determine the RPM of the differential. Using the intended gear to determine the intended gear ratio multiplied by the current RPM of the differential, yields the target input shaft speed. During this time the driver requested torque is also continuously calculated based upon the vehicle speed and the position of the accelerator pedal.

At this point, the gearshift sequence detailed earlier is initiated. The hybrid system controller issues the necessary commands to reduce sum torque on the input shaft of the automated manual transmission and by monitoring the resulting torque at the wheels, the system controller also commands the necessary torque increase to the second propulsion system to maintain a torque value on all four wheels equal to the current request from the driver. The shift process continues through a neutral position and upon engagement of the targeted gear, the input shaft torque is increased back to the target torque value, while continuing to use the secondary propulsion system to supplement. The result is no loss of sum wheel torque during the shift.

This allows hybrid vehicle 10 to achieve maximum fuel efficiency without sacrificing drivability in a parallel hybrid vehicle system. The hybrid system controller 42 controls motor/generator system 40 which is coupled to input shaft 26 of transmission 18. Hybrid system controller 42 instructs motor/generator system 40 to rapidly synchronize input shaft 26 to the proper speed for engaging the next gear. This provides the ability to perform changes without opening the clutch mechanism of rear propulsion system 12 which resulted in smoother shifts and higher overall efficiency with regenerative energy sent to the battery during upshifts through motor/generator system 40.

Figure 3C:
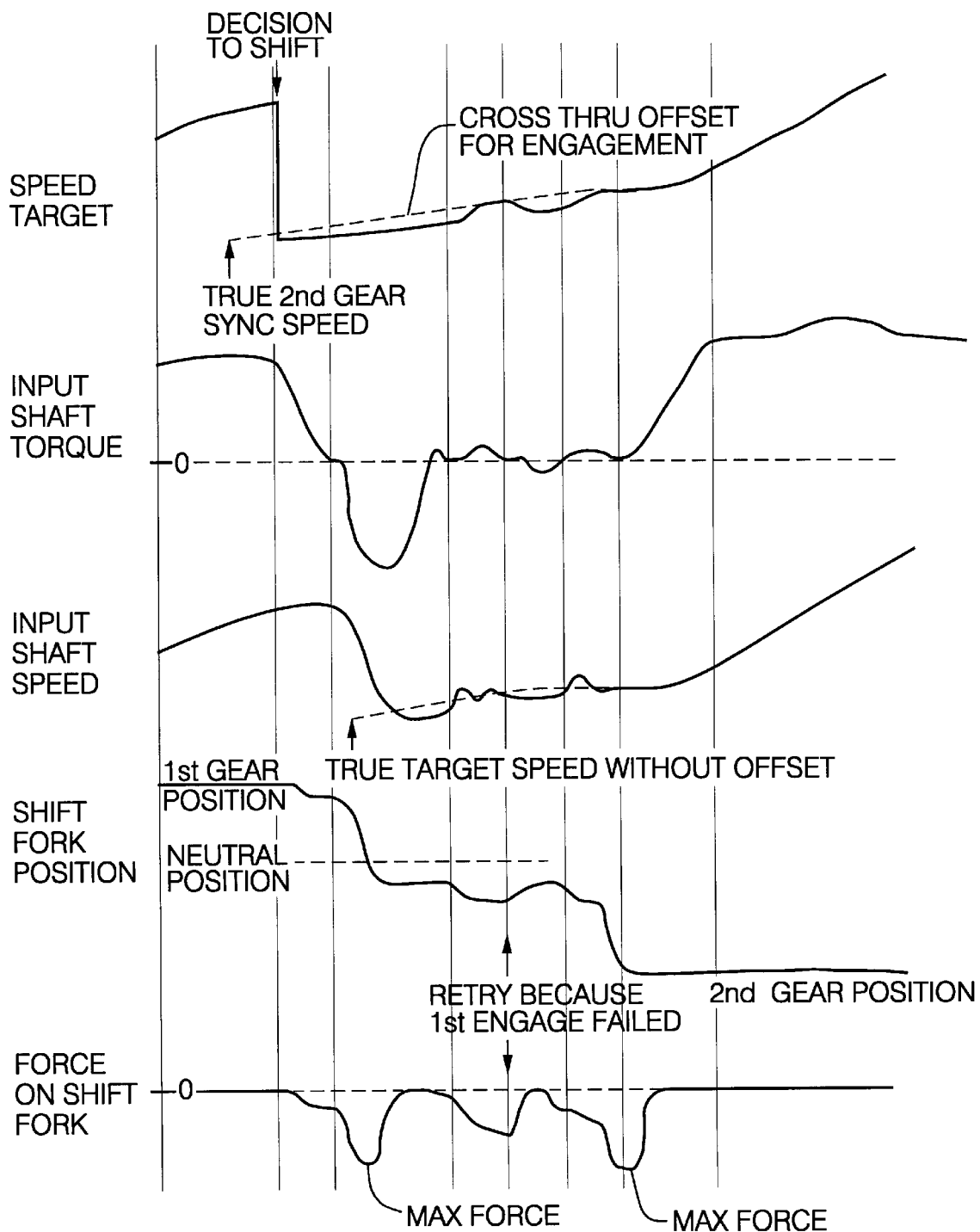
FIG. 3C illustrates shifter control and speed targeting for clutch closed shifting.

Referring now to FIG. 3c, a plurality of graphs illustrate the target speed, input shaft torque, input shaft speed, shift forkposition and force on the shift fork during a shifting sequence.

Figure 5:
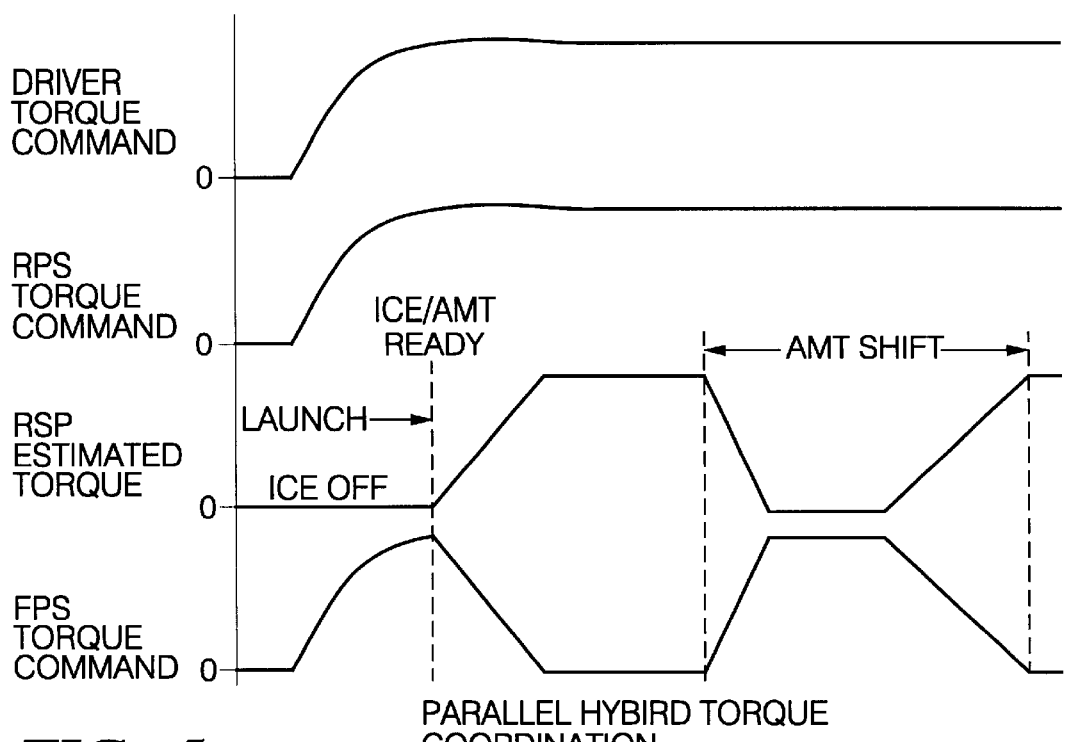
FIG. 5 is a chart representing a launching and shifting sequence of an alternative embodiment of the hybrid vehicle system of the present invention.

Referring now in particular to FIGS. 5 and 6, the utilization of FPS 14 and or MGS 40 in order to provide a secondary propulsion system that will meet the required torque demands of hybrid vehicle 10. In particular, front propulsion system 14 will provide a driving force to the front wheels of hybrid vehicle 10 in order to fill the torque gaps encountered when automated manual transmission 18 shifts gears.

In addition, front propulsion system 14 will also provide a supplemental torque driving force in launch situations when rear propulsion system 12 is not yet capable of providing the necessary driving force.

A driver torque command is inputted into a hybrid system controller 42 and is converted into a driver's torque command which is illustrated by the graph in FIG. 5. Hybrid system controller 42 submits a signal to a rear propulsion system (RPS) controller 44 and the rear propulsion system (RPS) torque command is calculated. Moreover, the rear propulsion system torque command is calculated by the following equation:

$$RPS_{torque\ command} = (Driver\ torque\ command)(Rear\ axle\ torque\ split)$$

Wherein the rear axle torque split is the fraction of the total torque that is desired to be produced by the rear propulsion system. Normally this fraction is 100%, but it can be different depending on the driving condition. For example, at vehicle launch the internal combustion engine may not even be running, which means its torque output will be zero.

The RPS estimated torque is calculated based upon feedback information from the internal combustion engine and the transmission. Prior to a shift, the internal combustion engine torque has to be reduced to zero, then the transmission is shifted, and then the internal combustion engine torque is restored. The transmission clutch torque is also reduced and restored, possibly at a different rate than the engine. This is accomplished through the manipulation of the transmission clutch or other torque reduction means, such as those of the instant application. Accordingly, both effects have to be considered.

For example, and during vehicle launch, the internal combustion engine may not even beginning, therefore its torque output is zero. After the ICE is started and the transmission is shifted, the rear propulsion system estimated torque output will increase to the requested level or driver torque command.

In this embodiment, dynamic models are used to predict trajectories of the ICE and transmission torque so that lags in response of the rear propulsion system can be accommodated.

The front propulsion system (FPS) torque command is calculated using the rear propulsion system (RPS) estimated torque such that the sum of the front propulsion system actual torque and rear propulsion system actual torque will be equal to the driver torque command.

The FPS torque command is calculated using the RPS estimated torque such that the sum of the FPS actual torque and the RPS actual torque will be equal to the driver torque command. For example, $$FPS_{torque\ command} = Driver\ torque\ command - RPS_{estimated\ torque}$$

Accordingly, and referring now to FIG. 5, a chart illustrates the dynamic front and rear torque coordination for use in a parallel hybrid vehicle. The chart depicts Driver, RPS and FPS torque commands and RPS estimated torque against each other. Moreover, chart 162 illustrates a launch scenario as well as a transmission shift.

In particular, it can be seen that the FPS torque command is increased to compensate for the driver torque command during a launch scenario where the ICE is not running. As the ICE and transmission to which it is coupled begin to meet the driver torque command the FPS torque command is decreased accordingly.

Is also noted that during a transmission shift the RPS estimated torque will drop, and accordingly, the FPS torque command will increase to meet the required driver torque command.

$$(FPS_{torque\ command} = Driver\ torque\ command - RPS_{estimated\ torque})$$

Decision node 94 determines whether the RPS torque command is less than 100%. The RPS estimated torque is calculated from the following equation, which is based upon the current status of the ICE and transmission.

$$RPS_{estimated\ torque} = \min(ICE\ estimated\ torque, AMT\ estimated\ torque)$$

The status of the ICE and automated manual transmission AMT is provided to hybrid system controller 42 to RPS controller 44.

Finally, and based upon the RPS estimated torque, steps 98 and 100 determine the necessary torques and FPS torque command to be placed upon the FPS from hybrid system controller 42.

The ICE and transmission estimated torque are provided by dynamic models which provide the necessary information based upon the current state of the ICE or transmission, such as the running rate of the ICE and/or transmission.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. The method of providing a propulsion force for a hybrid vehicle, comprising:
   a) providing a first driving force to at least one wheel of said hybrid vehicle, said first driving force being generated by an internal combustion engine coupled to an automated manual transmission;
   b) anticipating torque drop-offs or oscillations associated with the shifting of said automated manual transmission; and
   c) providing a second driving force to said wheel, said second driving force prevents said torque drop-offs or oscillations.

2. The method of providing a propulsion force for a hybrid vehicle, comprising:
   a) providing a first driving force to at least one wheel of said hybrid vehicle, said first driving force being generated by an internal combustion engine coupled to an automated manual transmission;
   b) anticipating torque drop-offs or oscillations associated with the shifting of said automated manual transmission; and
   c) providing a second driving force to another wheel of said hybrid vehicle, said second driving force prevents said torque drop-offs or oscillations.

3. The method of providing a driving force to a hybrid vehicle, comprising:
   a) utilizing a first torque path for providing a driving force to at least one wheel of said vehicle; and
   b) utilizing a second torque path for providing a supplemental driving force to at least one wheel of said vehicle, said second torque path being activated during a shift sequence of an automated manual transmission.

4. The method of providing a driving force to a hybrid vehicle, comprising:
   a) using, ramp profiles to modify the sum torque applied to an input shaft by at least two propulsion systems; and
   b) combining the properties of said propulsion systems into a single value, said value being an optimal condition for modifying the sum torque applied to said input shaft.

5. The method of shifting a transmission of a hybrid vehicle, comprising:
   a) combining the torque force of an internal combustion engine and a motor/generator system in order to provide active speed synchronization to an input shaft of a transmission wherein said input shaft remains coupled to said internal combustion engine during said active speed synchronization of said input shaft.

6. The method as in claim 5, further comprising:
b) calculating a speed target for said input shaft during said speed synchronization.

7. The method as in claim 6, further comprising:
c) Applying a torque force to said input shaft in order to cause said input shaft to reach said speed target.

8. The method as in claim 7, further comprising:
d) calculating an offset value; and
e) modifying said speed target by a value equal to said offset value, said modified speed target prevents and proper meshing of a pair of the gears of a transmission.

9. The method as in claim 8, further comprising:
f) a first propulsion system being configured and positioned to provide a driving force to at least one wheel of said vehicle;
g) a second propulsion system being configured and positioned to provide a driving force to another wheel of said vehicle;
h) a second propulsion system controller for actuating said second propulsion system; and
i) a system controller for actuating said first propulsion system and providing command request to said second propulsion control system, said system controller utilizes a control algorithm for determining the necessary commands to be provided to said first and second propulsion systems so as to provide said hybrid vehicle with a continuous driving force.

10. A propulsion system for use in a hybrid vehicle, comprising:
a) a first propulsion system being configured and positioned to provide a driving force to at least one wheel of said vehicle;
b) a second propulsion system being configured and positioned to provide a driving force to another wheel of said vehicle;
c) a second propulsion system controller for actuating said second propulsion system; and
d) a system controller for actuating said first propulsion system and providing command request to said second propulsion control system, said system controller utilizes a control algorithm for determining the necessary commands to be provided to said first and second propulsion systems so as to provide said hybrid vehicle with a continuous driving force.

11. The propulsion system as in claim 10, wherein said second propulsion system comprises:
i) an internal combustion engine providing a driving force to an automated manual transmission having an input shaft and an output shaft, said output shaft being configured, dimensioned and positioned to provide a driving force to at least one wheel of said vehicle.

12. The propulsion system as in claim 11, further comprising:
e) a motor/generator system being coupled to said input shaft at a first position and said input shaft being coupled to said internal combustion engine at a second position, said second position being remote from said first position, said motor/generator system is configured to provide a driving force to said input shaft or in the alternative receive a driving force from said input shaft.

13. The propulsion system as in claim 12, wherein said motor/generator system provides a torque force to said input shaft in order to facilitate the shifting of said transmission without decoupling said input shaft from said internal combustion engine.

14. The propulsion system as in claim 12, wherein said motor/generator system generates an electrical charge to be utilized by said hybrid vehicle.

15. The propulsion system as in claim 12, wherein said system controller utilizes a computer algorithm in order to determine the torque force to applied to said input shaft in order to facilitate the shifting of said transmission.

16. A propulsion system for use in a hybrid vehicle, comprising:
a) a first propulsion system being configured and positioned to provide a driving force to at least one wheel of said vehicle;
b) a second propulsion system being configured and positioned to provide a driving force to another wheel of said vehicle;
c) a second propulsion system controller for actuating said second propulsion system; and
d) a system controller for actuating said first propulsion system and providing command request to said second propulsion control system, said system controller utilizes a control algorithm for determining the necessary commands to be provided to said first and second propulsion systems so as to provide said hybrid vehicle with a continuous driving force.

17. The propulsion system as in claim 16, wherein said second propulsion system comprises:
i) an internal combustion engine providing a driving force to an automated manual transmission having an input shaft and an output shaft, said output shaft being configured, dimensioned and positioned to provide a driving force to said second set of wheels.

18. The propulsion system as in claim 17, wherein said first propulsion system is an electric traction drive for providing a continuous torque output to said first set of wheels, and said system controller instructs said first propulsion system to increase and/or decrease the continuous torque output of said first propulsion system in order to provide said hybrid vehicle with the continuous driving force.

19. The propulsion system as in claim 13, wherein said first propulsion system is an electric traction drive for providing a continuous torque output to at least one wheel of said vehicle, and said system controller instincts said first propulsion system to increase and/or decrease the continuous torque output of said first propulsion system in order to provide said hybrid vehicle with the continuous driving force.

* * * * *